(12) United States Patent  (10) Patent No.: US 8,284,820 B2
Chen et al.  (45) Date of Patent: Oct. 9, 2012

(54) SHARED PROCESSOR ARCHITECTURE APPLIED TO FUNCTIONAL STAGES CONFIGURED IN A RECEIVER SYSTEM FOR PROCESSING SIGNALS FROM DIFFERENT TRANSMITTER SYSTEMS AND METHOD THEREOF

(75) Inventors: Chun-Nan Chen, Taipei (TW); Jia-Horng Shieh, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 843 days.

(21) Appl. No.: 11/873,415

(22) Filed: Oct. 17, 2007

(65) Prior Publication Data

US 2009/0106535 A1  Apr. 23, 2009

(51) Int. Cl.
*H04B 1/709* (2011.01)
(52) U.S. Cl. ........................................ 375/150
(58) Field of Classification Search ............. 375/142, 375/147, 148, 150
See application file for complete search history.

(56) References Cited

U.S. PATENT DOCUMENTS

| | | | | |
|---|---|---|---|---|
| 5,805,108 | A * | 9/1998 | Lennen | 342/357.68 |
| 6,642,884 | B2 * | 11/2003 | Bryant et al. | 342/357.1 |
| 7,095,368 | B1 | 8/2006 | van Diggelen | |
| 7,286,592 | B2 * | 10/2007 | Pietila et al. | 375/147 |
| 2002/0005802 | A1 | 1/2002 | Bryant | |
| 2004/0088108 | A1 | 5/2004 | Bloebaum et al. | |
| 2004/0234008 | A1 * | 11/2004 | Diggelen et al. | 375/343 |
| 2005/0175075 | A1 | 8/2005 | Martin et al. | |
| 2005/0185700 | A1 * | 8/2005 | Pietila et al. | 375/147 |
| 2005/0231424 | A1 | 10/2005 | Bloebaum et al. | |
| 2006/0140254 | A1 * | 6/2006 | Pietila et al. | 375/147 |
| 2006/0209779 | A1 * | 9/2006 | Rousu et al. | 370/343 |
| 2007/0274374 | A1 * | 11/2007 | Abraham | 375/148 |
| 2008/0279260 | A1 * | 11/2008 | Yeh et al. | 375/150 |
| 2009/0041089 | A1 * | 2/2009 | Jhang et al. | 375/139 |

FOREIGN PATENT DOCUMENTS

WO  WO 2007/118327  * 10/2007

OTHER PUBLICATIONS

Raymond A. Eastwood, "An Integrated GPS/GLONASS Receiver", Journal of Telemetry, Tracking, and Command, Aug. 1991, p. 72-80, vol. 12, No. 4, Beijing, China.

* cited by examiner

*Primary Examiner* — Kevin Kim
(74) *Attorney, Agent, or Firm* — Winston Hsu; Scott Margo (57) ABSTRACT

According to an embodiment of the present invention, a shared processor architecture in a receiver system is disclosed. The receiver system is configured to have a first functional stage and a second functional stage for processing information carried by signals from a first transmitter system and a second transmitter system respectively. The first functional stage and the second functional stage correspond to an identical signal processing function. The shared processor architecture includes a first processor, allocated to the first functional stage and the second functional stage, for processing an output generated from the first functional stage or an output from the second functional stage.

8 Claims, 9 Drawing Sheets

SHARED PROCESSOR ARCHITECTURE APPLIED TO FUNCTIONAL STAGES CONFIGURED IN A RECEIVER SYSTEM FOR PROCESSING SIGNALS FROM DIFFERENT TRANSMITTER SYSTEMS AND METHOD THEREOF

BACKGROUND

The present invention relates to signal processing in a receiver system, and more particularly, to a shared processor architecture applied to functional stages configured in a receiver system for processing signals from different transmitter systems (e.g., GNSS systems) and method thereof.

Figure 1:
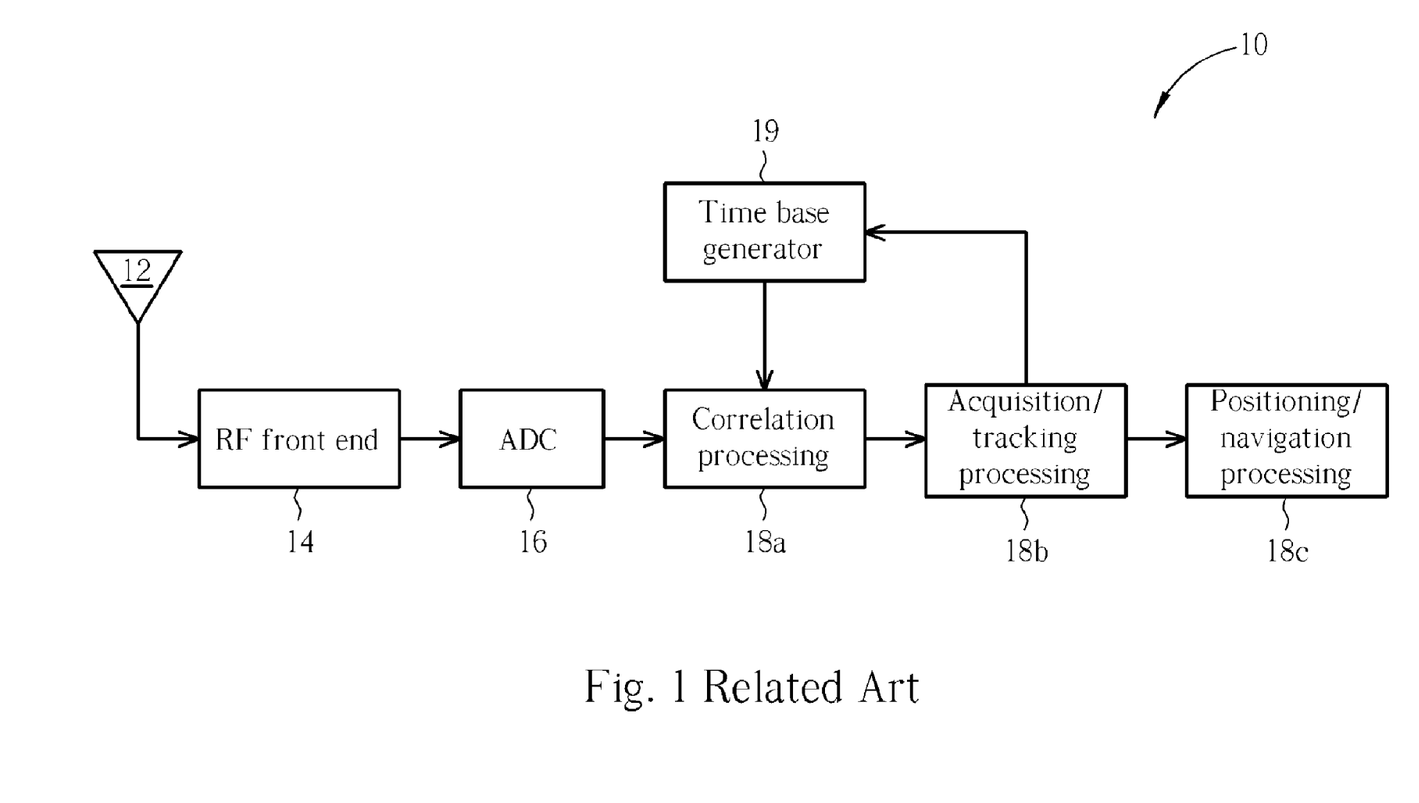
FIG. 1 is a block diagram illustrating a first conventional global navigation satellite system receiver.

Please refer to FIG. 1. FIG. 1 is a block diagram illustrating a first conventional global navigation satellite system (GNSS) receiver 10. The GNSS receiver 10 comprises an antenna 12, an RF front end 14, an analog-to-digital converter (ADC) 16, a plurality of functional stages 18a, 18b, 18c performing correlation processing, acquisition/tracking processing and positioning/navigation processing respectively, and a time base generator 19. The GNSS receiver 10 supports a single GNSS system (e.g., GPS, Galileo, or GLONASS). The antenna 12 is used for receiving an RF signal transmitted from a satellite of the supported GNSS system, and the RF front end 14 converts the RF signal into an intermediate frequency (IF) signal. Next, the analog-to-digital converter (ADC) 16 converts the incoming analog IF signal into a digital IF signal which is further fed into the following functional stage 18a. As shown in FIG. 1, the correlation processing, acquisition/ tracking processing and positioning/navigation processing are executed in order to complete the positioning signal processing. Furthermore, the time base generator 19 is coupled between the functional stages 18a and 18b, and is managed by the functional stage 18b and configured to provide the time base to the functional stage 18a for informing the functional stage 18a of the integration period of correlating the input signal with a local code replica. Since the details of the GNSS receiver 10 are known to those skilled in this art, further description is omitted for brevity.

Figure 2:
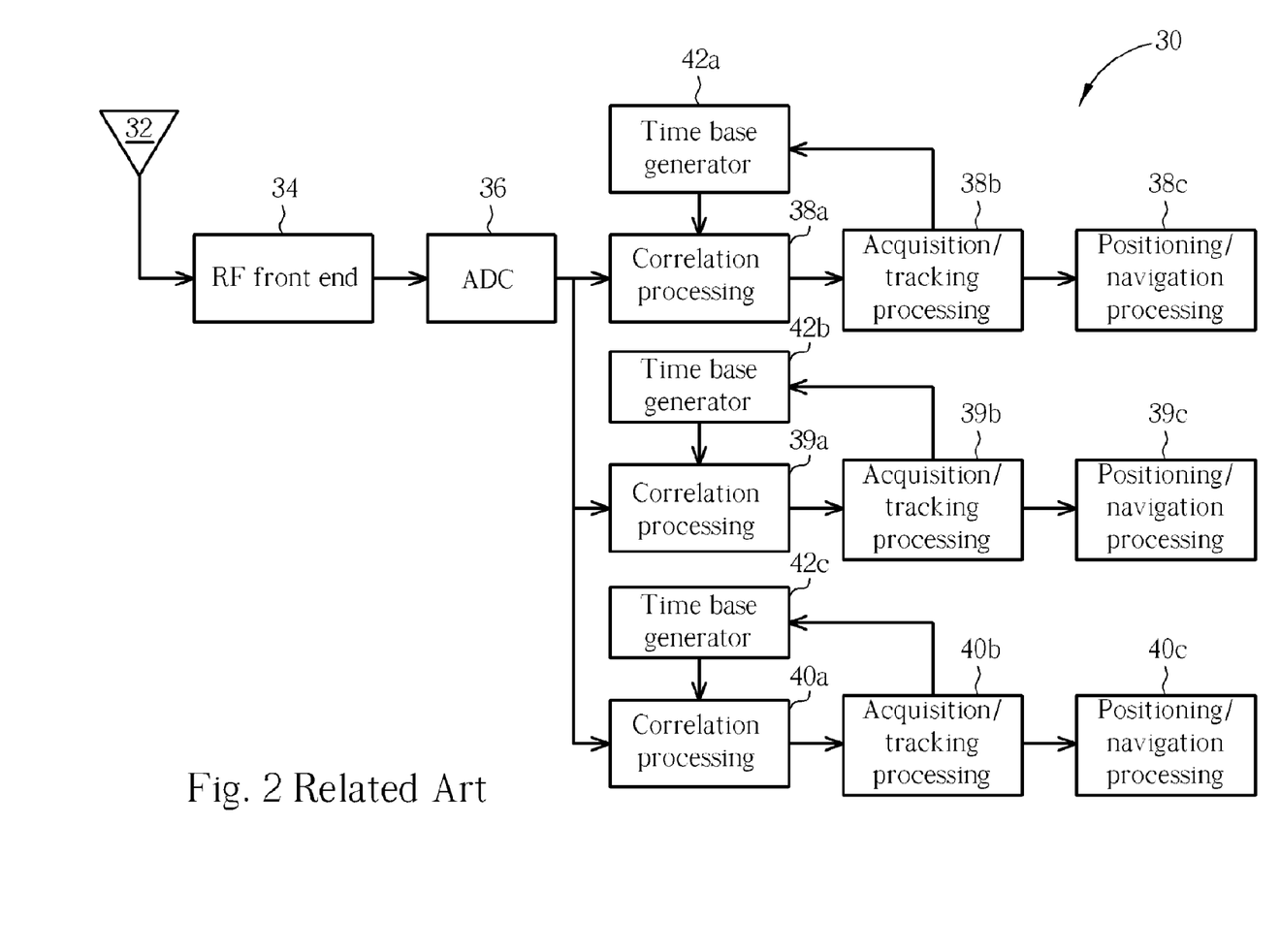
FIG. 2 is a diagram illustrating a second conventional global navigation satellite system receiver.

To offer better positioning precision, a GNSS receiver supporting multiple GNSS systems is provided. Referring to FIG. 2, it is a diagram illustrating a second conventional global navigation satellite system (GNSS) receiver 30. The GNSS receiver 30 comprises an antenna 32, an RF front end 34, an ADC 36, a plurality of functional stages 38a, 39a, 40a performing correlation processing, a plurality of functional stages 38b, 39b, 40b performing acquisition/tracking processing, a plurality of functional stages 38c, 39c, 40c performing positioning/navigation processing, and a plurality of time base generators 42a, 42b, 42c. The GNSS receiver 30 is designed to support multiple GNSS systems, such as GPS, Galileo, and GLONASS, based upon the architecture shown in FIG. 1. The components of the same name in FIG. 1 and FIG. 2 have identical operation and functionality, and further description is omitted for brevity. In the GNSS receiver 30, a combination of the functional stages 38a, 38b, 38c is implemented for processing signals from the first GNSS system (e.g., GPS), a combination of the functional stages 39a, 39b, 39c is implemented for processing signals from the second GNSS system (e.g., Galileo), and a combination of the functional stages 40a, 40b, 40c is implemented for processing signals from the third GNSS system (e.g., GLONASS).

As shown in FIG. 2, the GNSS receiver 30 is designed to allocate a signal processing chain, which contains a plurality of functional stages, to each of the supported GNSS systems. However, the signal processing chains are not active at the same time. For example, in a case where the signal processing chain including the functional stages 38a, 38b, 38c is enabled to process signals from a GPS satellite, the remaining signal processing chains are idle. As a result, the architecture of the GNSS receiver 30 supporting multiple GNSS systems is not cost-efficient and resource-efficient. As a result, a novel GNSS receiver architecture supporting multiple GNSS systems is needed.

SUMMARY

It is therefore one of the objectives of the claimed invention to provide a shared processor architecture applied to functional stages configured in a receiver system for processing signals from different transmitter systems (e.g., GNSS systems) and method thereof.

According to one aspect of the present invention, a shared processor architecture in a receiver system is disclosed. The receiver system is configured to have a first functional stage and a second functional stage for processing information carried by signals from a first transmitter system and a second transmitter system respectively. The first functional stage and the second functional stage correspond to an identical signal processing function. The shared processor architecture comprises a first processor, allocated to the first functional stage and the second functional stage, for processing an output generated from the first functional stage or an output from the second functional stage.

According to another aspect of the present invention, a signal processing method in a receiver system is disclosed. The signal processing method comprises: configuring the receiver system to have a first functional stage and a second functional stage for processing information carried by signals from a first transmitter system and a second transmitter system respectively, wherein the first functional stage and the second functional stage correspond to an identical signal processing function; and allocating a first processor to the first functional stage and the second functional stage for processing an output generated from the first functional stage or an output from the second functional stage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
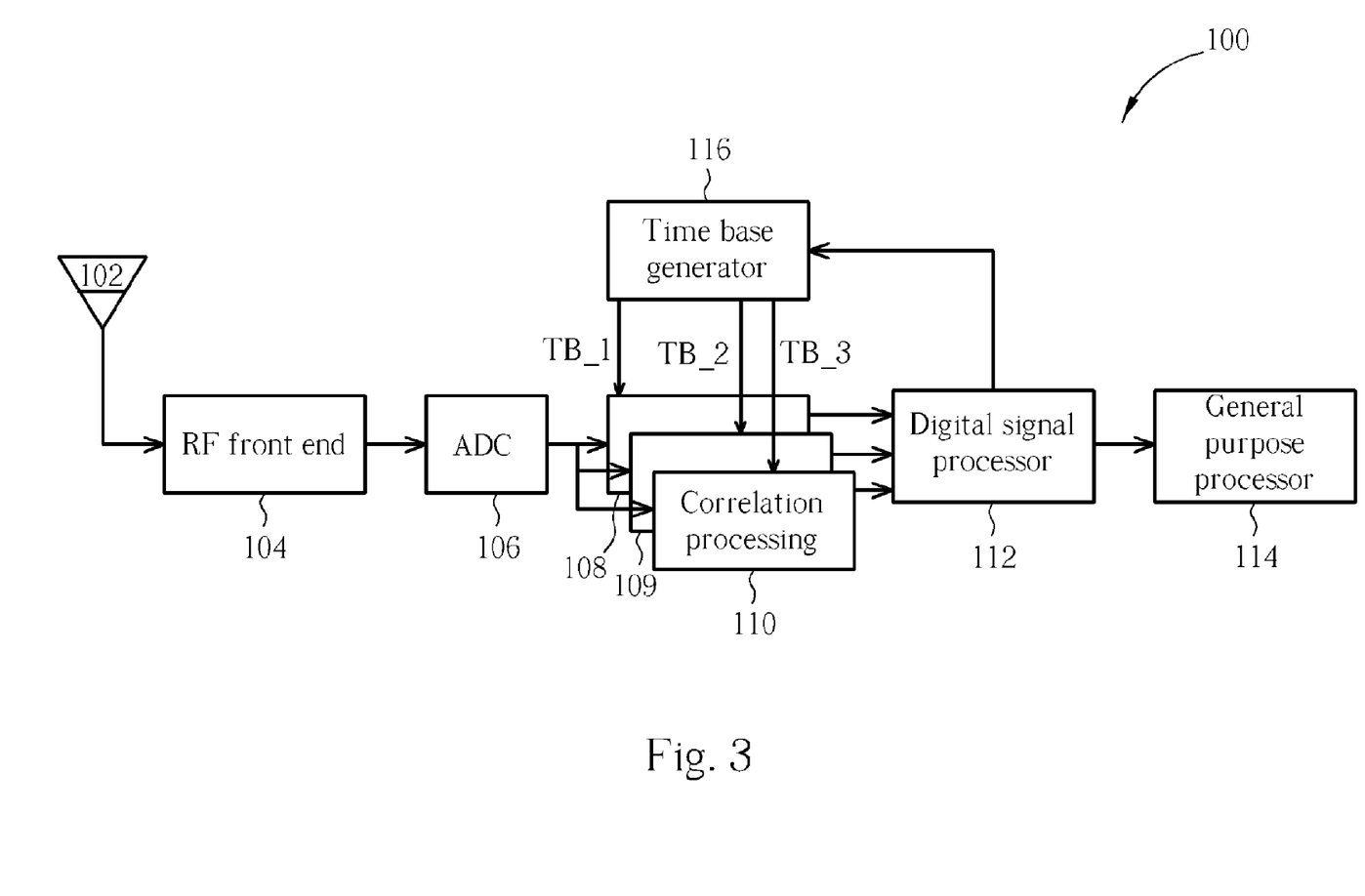
FIG. 3 is a block diagram illustrating a GNSS receiver according to a first embodiment of the present invention.
Figure 4:
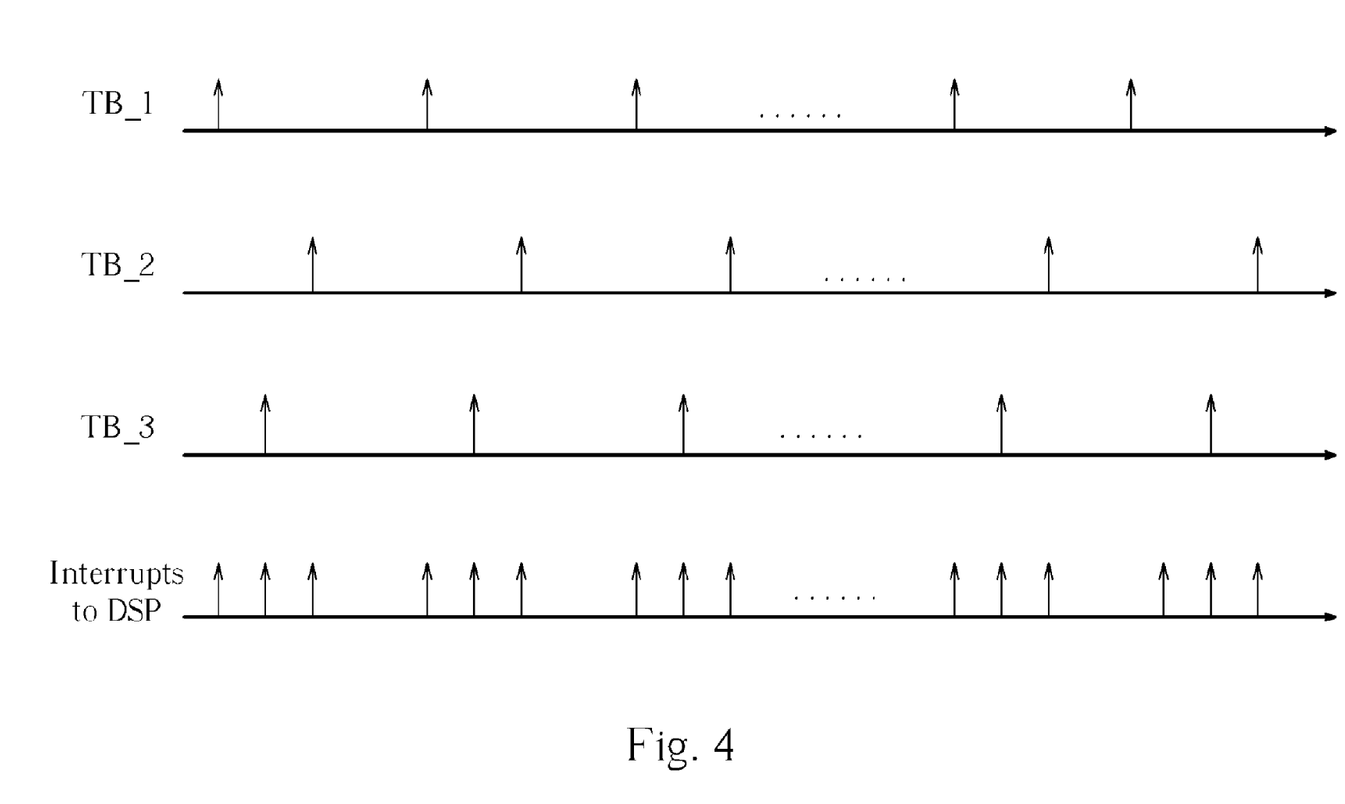
FIG. 4 is a timing diagram illustrating time bases referenced by difference functional stages and interrupts outputted to a digital signal processor shown in FIG. 3.

Please refer to FIG. 3. FIG. 3 is a block diagram illustrating a GNSS receiver 100 according to a first embodiment of the present invention. The GNSS receiver 100 comprises an antenna 102, an RF front end 104, an ADC 106, a plurality of functional stages 108, 109, 110 performing correlation processing, a digital signal processor (DSP) 112 performing acquisition/tracking processing, a general purpose processor 114 performing positioning/navigation processing, and a time base generator 116. For example, the general purpose processor 114 is implemented by an ARM-based processor. The components of the same name in FIG. 2 and FIG. 3 have identical operation and functionality, and further description is omitted for brevity. The GNSS receiver 100 is designed to support multiple GNSS systems, such as GPS, Galileo, and GLONASS. In this embodiment, the time base generator 116 is managed by the DSP 112 dedicated to processing outputs of the preceding functional stages 108, 109, 110, and the time base generator 116 is allocated to the functional stages 108, 109, 110 to provide time bases TB_1, TB_2, TB_3 to the functional stages 108, 109, 110 respectively. As shown in FIG. 3, only one hardware component, DSP 112, is implemented to perform acquisition/tracking processing according to correlation outputs of the functional stages 108, 109, 110. In general, the hardware components, functional stages 108, 109, 110, communicate with the DSP 112 via issuing interrupts to the DSP 112 under the control of the time bases given by the time base generator 116. FIG. 4 is a timing diagram illustrating the time bases TB_1, TB_2, and TB_3 and interrupts outputted to the DSP 112. As shown in FIG. 4, the adjacent time ticks of the time base TB_1 defines an integration period of correlating the input signal (i.e., the digital IF signal outputted from the ADC 106) with a local code replica corresponding to one satellite in the first GNSS system (e.g., GPS); the adjacent time ticks of the time base TB_2 defines an integration period of correlating the input signal (i.e., the digital IF signal outputted from the ADC 106) with a local code replica corresponding to one satellite in the second GNSS system (e.g., Galileo); and the adjacent time ticks of the time base TB_3 defines an integration period of correlating the input signal (i.e., the digital IF signal outputted from the ADC 106) with a local code replica corresponding to one satellite in the third GNSS system (e.g., GLONASS).

Additionally, in the embodiment shown in FIG. 3, a single general purpose processor 114 is dedicated to processing data outputted from the DSP 112 to perform the positioning/navigation processing. Compared to the conventional GNSS receiver 30 shown in FIG. 2, functional stages required for performing acquisition/tracking processing in the GNSS receiver 30 are replaced with a single DSP 112 in this embodiment; similarly, functional stages required for performing positioning/navigation processing in the GNSS receiver 30 are replaced with a single general purpose processor 114 in this embodiment. In this way, the computing resources are optimized, and the hardware cost is reduced accordingly.

Figure 5:
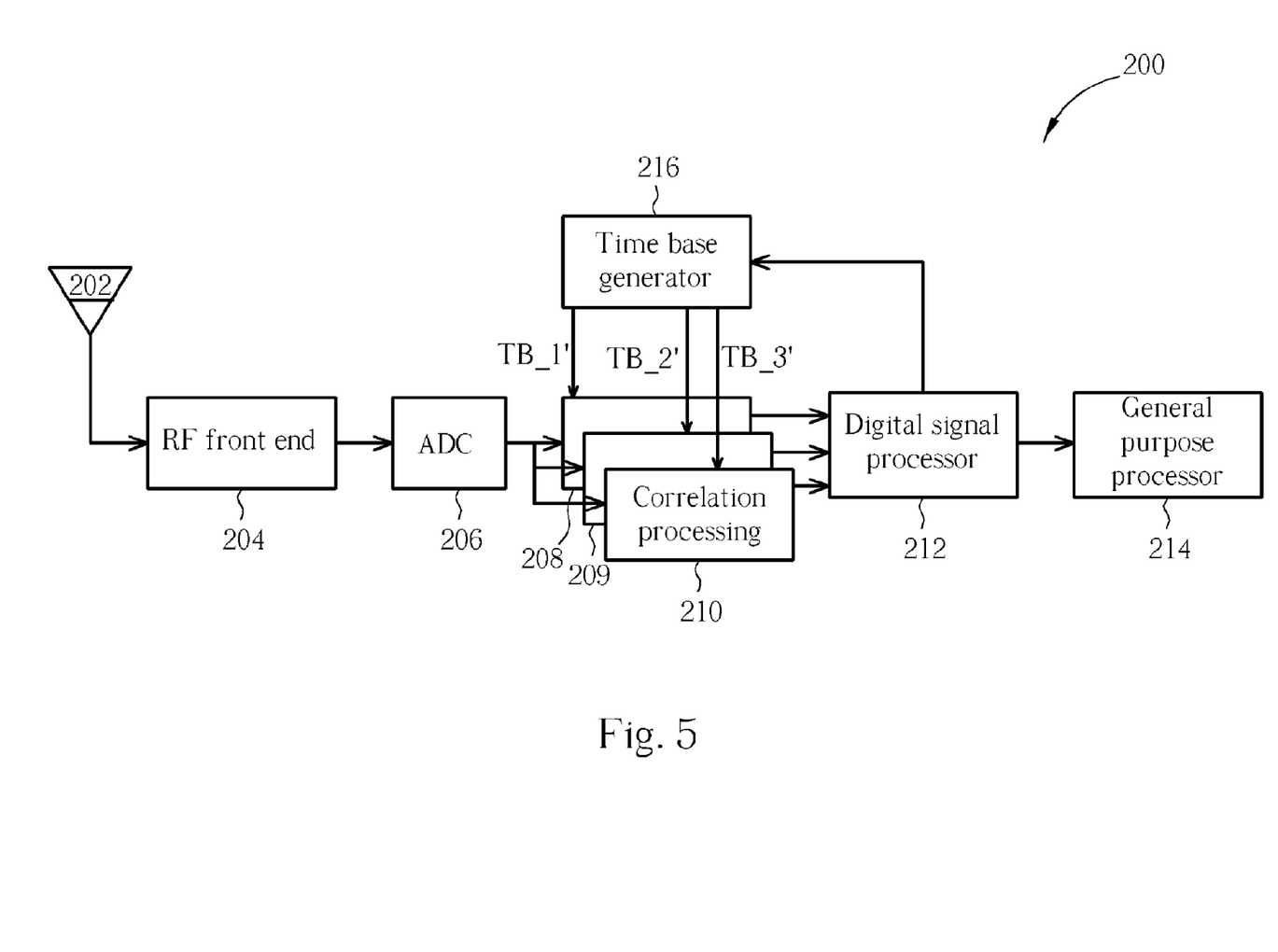
FIG. 5 is a block diagram illustrating a GNSS receiver according to a second embodiment of the present invention.

Please refer to FIG. 5. FIG. 5 is a block diagram illustrating a GNSS receiver 200 according to a second embodiment of the present invention. The GNSS receiver 200 comprises an antenna 202, an RF front end 204, an ADC 206, a plurality of functional stages 208, 209, 210 performing correlation processing, a DSP 212 performing acquisition/tracking processing, a general purpose processor 214 performing positioning/navigation processing, and a time base generator 216. Please note that since the components of the same name in FIG. 5 and FIG. 3 have identical operation and functionality, further description is omitted here for brevity. The GNSS receiver 200 is designed to support multiple GNSS systems, such as GPS, Galileo, and GLONASS. In this embodiment, the time base generator 116 is managed by the DSP 112 dedicated to processing outputs of the preceding functional stages 108, 109, 110, and the time base generator 116 is allocated to the functional stages 108, 109, 110 to provide a unique time base to the functional stages 108, 109, 110 respectively. In other words, the time bases TB_1, TB_2, TB_3 referenced by the functional stages 108, 109, 110 are synchronized.

Figure 6:
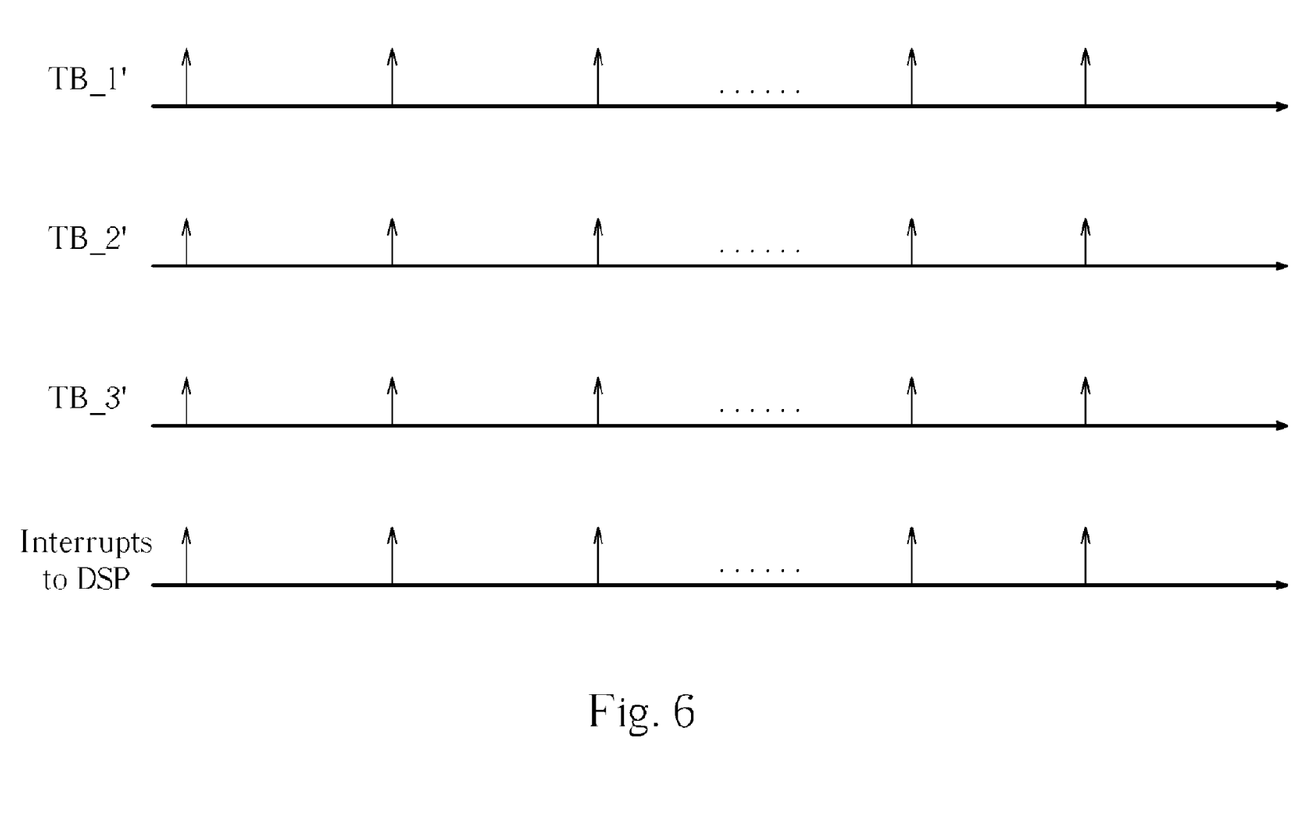
FIG. 6 is a timing diagram illustrating synchronized time bases referenced by difference functional stages and interrupts outputted to a digital signal processor shown in FIG. 5.

Please refer to FIG. 4 in conjunction with FIG. 6. FIG. 6 is a timing diagram illustrating the synchronized time bases TB_1', TB_2', and TB_3' and interrupts outputted to the DSP 212. As shown in FIG. 6, the time bases of the functional stages 208, 209, 210 are aligned, thereby reducing the number of interrupts outputted to the DSP 212. As one can see, when the time base generator 116 provides distinct time bases to the functional stages 108, 109, 110 as illustrated in FIG. 4, the DSP 112 is interrupted frequently. This will greatly degrade computing performance of the DSP 112. However, synchronizing the time bases referenced by the functional stages 208, 209, 210 through offering a unique time base will prevent the DSP 212 from being interrupted frequently, thereby improving the computing performance of the DSP 212 greatly. Moreover, the timing control of the functional stages 108, 109, 110 configured to perform the correlation processing and the interface between the DSP 212 and functional stages 208, 209, 210 can be simplified accordingly.

Figure 7:
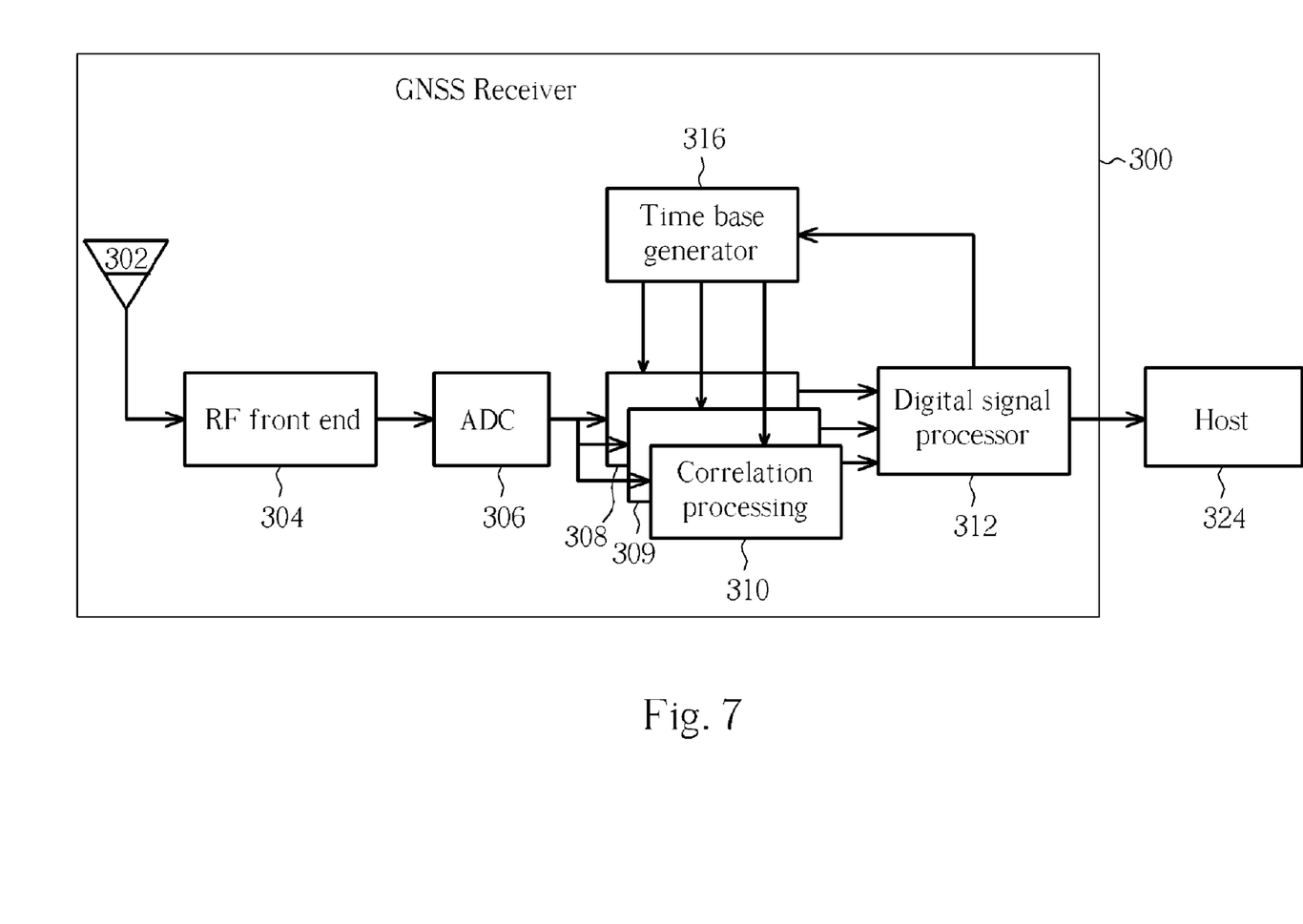
FIG. 7 is a block diagram illustrating a GNSS receiver according to a third embodiment of the present invention.

Please refer to FIG. 7. FIG. 7 is a block diagram illustrating a GNSS receiver 300 according to a third embodiment of the present invention. The GNSS receiver 300 comprises an antenna 302, an RF front end 304, an ADC 306, a plurality of functional stages 308, 309, 310 performing correlation processing, a DSP 312 performing acquisition/tracking processing, and a time base generator 316. The architecture shown in FIG. 7 is similar to that shown in FIG. 3. In addition, since the components of the same name in FIG. 7 and FIG. 3 have identical operation and functionality, further description is omitted here for brevity. The key difference between these embodiments is that the GNSS receiver 300 does not perform the positioning/navigation processing internally. Instead, the positioning information outputted from the DSP 312 is delivered to an external host 324 for further processing, i.e., the positioning/navigation processing. Please note that the host 324 could be a personal computer (PC), a pocket PC, a smart phone, or a personal digital assistant (PDA). Additionally, a skilled person can readily appreciate that the above technique of using a unique time base can be applied to the GNSS receiver 300 by making appropriate modifications in reference to the architecture shown in FIG. 5. This alternative design also obeys the spirit of the present invention, and falls in the scope of the present invention.

Based upon above disclosure, other receiver designs obeying the spirit of the present invention are also possible. For illustrative purposes, some alternative designs are given as below.

Figure 8:
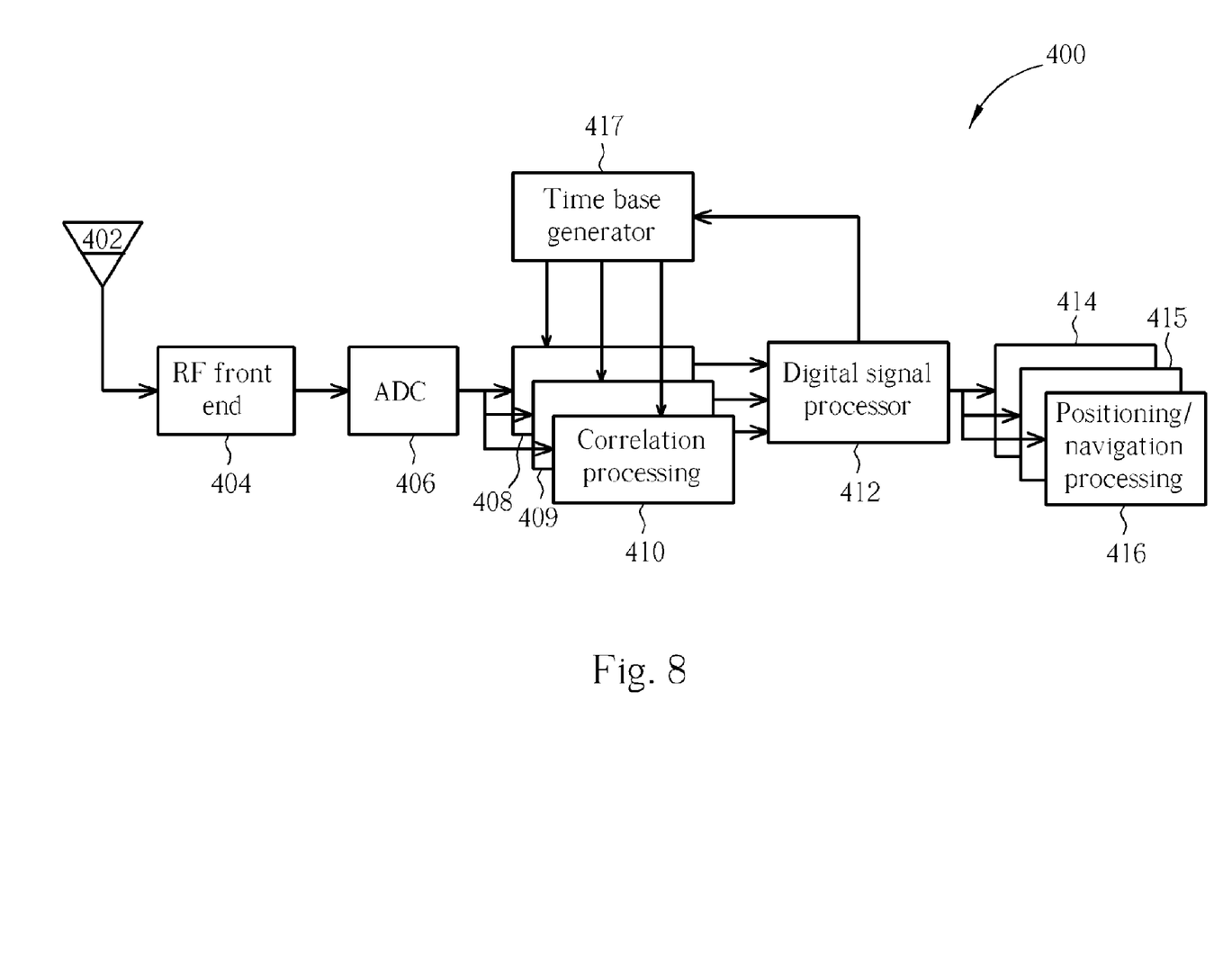
FIG. 8 is a block diagram illustrating a GNSS receiver according to a fourth embodiment of the present invention.

Please refer to FIG. 8. FIG. 8 is a block diagram illustrating a GNSS receiver 400 according to a fourth embodiment of the present invention. The GNSS receiver 400 comprises an antenna 402, an RF front end 404, an ADC 406, a plurality of functional stages 408, 409, 410 performing correlation processing, a DSP 412 performing acquisition/tracking processing, a plurality of functional stages 414, 415, 416 performing positioning/navigation processing, and a time base generator 417. Since a skilled person can readily understand operations of the GNSS receiver 400 after reading above disclosure, further description is omitted here for brevity. Similarly, the aforementioned technique of using a unique time base can be applied to the GNSS receiver 400 by making appropriate modifications in reference to the architecture shown in FIG. 5. This also obeys the spirit of the present invention, and falls in the scope of the present invention.

Figure 9:
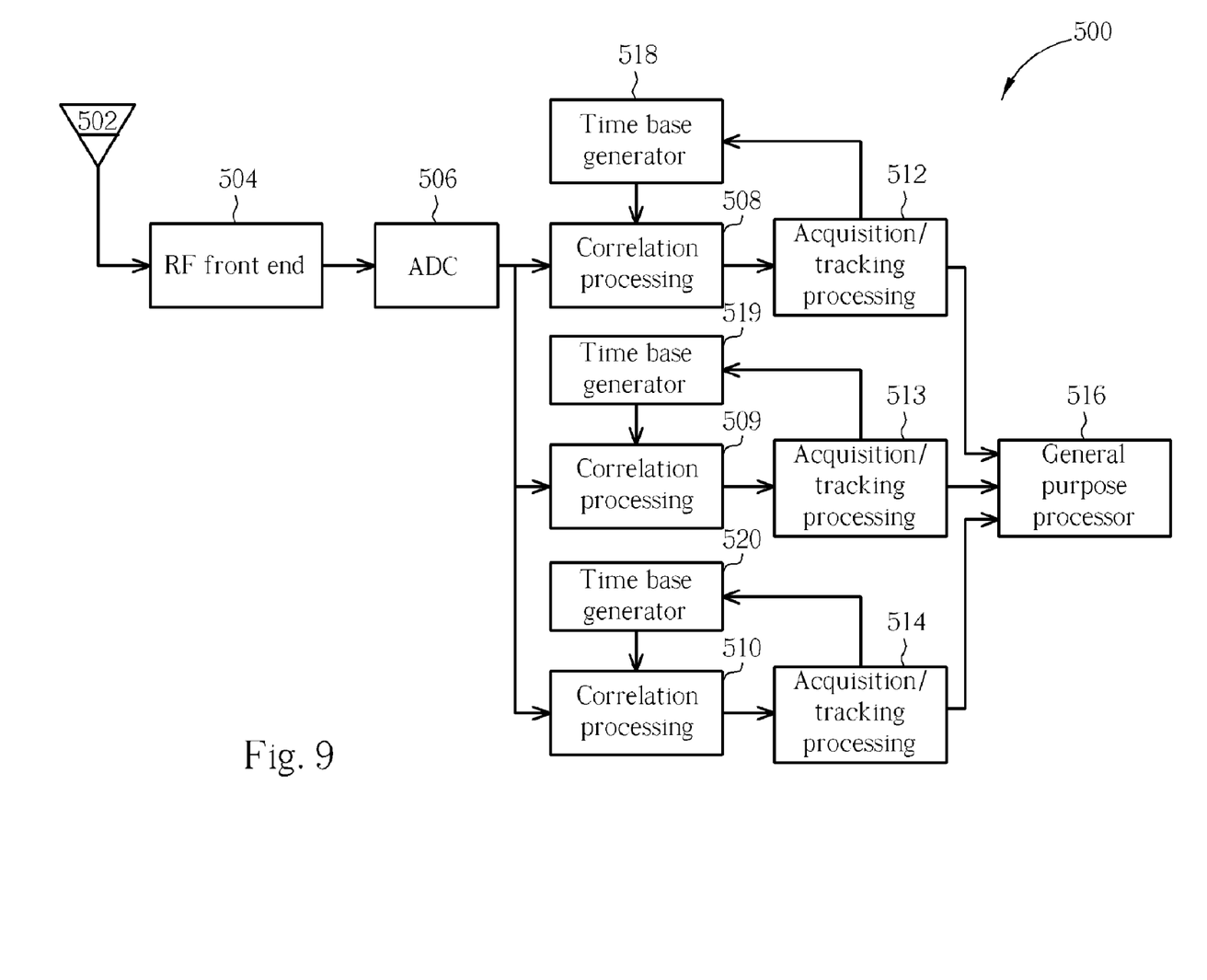
FIG. 9 is a block diagram illustrating a GNSS receiver according to a fifth embodiment of the present invention.

Please refer to FIG. 9. FIG. 9 is a block diagram illustrating a GNSS receiver 500 according to a fifth embodiment of the present invention. The GNSS receiver 500 comprises an antenna 502, an RF front end 504, an ADC 506, a plurality of functional stages 508, 509, 510 performing correlation processing, a plurality of functional stages 512, 513, 514 performing acquisition/tracking processing, a general purpose processor 516 performing positioning/navigation processing, and a plurality of time base generators 518, 519, 520. Since a skilled person can readily understand operations of the GNSS receiver 500 after reading above disclosure, further description is omitted here for brevity.

It should be noted that in certain embodiments of the present invention, the GPS system supported by the GNSS receivers also includes the Satellite Based Augmentation System (SBAS) such as the Wide Area Augmentation System (WAAS). Additionally, the present invention is not limited to apply the disclosed shared processor architecture to different GNSS systems complying with different satellite navigation categories. Taking the GPS system for example, it is capable of utilizing different channels having different carrier frequencies to transmit signals. In other words, signals transmitted from a GPS system through a first carrier frequency and signals transmitted from the same GPS system through a second carrier frequency are regarded as signals transmitted from different GNSS systems in above embodiments of the present invention. As a result, the disclosed shared processor architecture (e.g., the aforementioned GNSS receiver 300 shown in FIG. 7) is still applicable in the case where different GNSS systems comply with the same satellite navigation category.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shared processor architecture in a receiver system, the receiver system configured to have a first functional stage and a second functional stage for processing information carried by signals from a first communication system and a second communication system respectively, the first functional stage and the second functional stage corresponding to an identical signal processing function, the shared processor architecture comprising:
    a first processor, allocated to the first functional stage and the second functional stage, for processing an output generated from the first functional stage or an output from the second functional stage; and
    a time base generator, managed by the first processor and allocated to the first functional stage and the second functional stage, for providing a plurality of time bases to the first functional stage and the second functional stage respectively.

2. The shared processor architecture of claim 1, wherein the first communication system is a first global navigation satellite system, and the second communication system is a second global navigation satellite system.

3. The shared processor architecture of claim 2, wherein the identical signal processing function is selected from a group consisting of a correlation processing and an acquisition/tracking processing.

4. The shared processor architecture of claim 1, wherein the time bases are identical.

5. The shared processor architecture of claim 1, wherein the identical signal processing function is a correlation processing, the first processor is configured to perform an acquisition/tracking processing according to the output from the first functional stage to generate first positioning information or according to the output from the second functional stage to generate second positioning information, and the shared processor architecture further comprises:
    a second processor, dedicated to the first processor, for performing a positioning/navigation processing according to the first positioning information or the second positioning information.

6. A signal processing method in a receiver system, comprising:
    (a) configuring the receiver system to have a first functional stage and a second functional stage for processing information carried by signals from a first communication system and a second communication system respectively, wherein the first functional stage and the second functional stage correspond to an identical signal processing function;
    (b) allocating a first processor to the first functional stage and the second functional stage for processing an output generated from the first functional stage or an output from the second functional stage; and
    (c) providing an identical time base to the first functional stage and the second functional stage.

7. The signal processing method of claim 6, wherein step (a) comprises:
    configuring the receiver system to utilize the first functional stage to process information carried by signals from a first global navigation satellite system; and
    configuring the receiver system to utilize the second functional stage to process information carried by signals from a second global navigation satellite system.

8. The signal processing method of claim 7, wherein the identical signal processing function is selected from a group consisting of a correlation processing and an acquisition/tracking processing.

* * * * *